United States Patent
Senatori

(10) Patent No.: US 9,698,515 B2
(45) Date of Patent: *Jul. 4, 2017

(54) PORT INCLUDING MOVABLE CONNECTOR

(71) Applicant: HEWLETT-PACKARD DEVELOPMENT COMPANY, L.P., Houston, TX (US)

(72) Inventor: Mark David Senatori, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/874,632

(22) Filed: Oct. 5, 2015

(65) Prior Publication Data

US 2016/0043495 A1 Feb. 11, 2016

Related U.S. Application Data

(63) Continuation of application No. 14/125,670, filed as application No. PCT/US2011/042171 on Jun. 28, 2011, now Pat. No. 9,184,536.

(51) Int. Cl.

| H01R 13/44 | (2006.01) |
| G06F 1/16 | (2006.01) |
| H01R 13/60 | (2006.01) |
| H01R 13/629 | (2006.01) |
| H01R 13/62 | (2006.01) |
| H01R 43/16 | (2006.01) |

(52) U.S. Cl.
CPC ........... *H01R 13/44* (2013.01); *G06F 1/1656* (2013.01); *H01R 13/60* (2013.01); *H01R 13/62* (2013.01); *H01R 13/62905* (2013.01); *H01R 43/16* (2013.01)

(58) Field of Classification Search
CPC .. H01R 35/04; H01R 13/635; H01R 13/2421; H01R 13/453
See application file for complete search history.

(56) References Cited

U.S. PATENT DOCUMENTS

| 5,562,463 | A | 10/1996 | Tan |
| 6,000,054 | A | 12/1999 | Bahr et al. |
| 6,077,100 | A | 6/2000 | Sakano |
| 6,135,786 | A | 10/2000 | Johnson et al. |
| 7,411,784 | B2 | 8/2008 | Coglitore et al. |
| 7,811,102 | B2 | 10/2010 | Lai |
| 7,845,953 | B2 | 12/2010 | Brock et al. |
| 7,896,676 | B2 | 3/2011 | Ziberna |
| 8,568,151 | B2 | 10/2013 | Cheng |
| 8,835,758 | B2 * | 9/2014 | Li ................. H05K 5/0278 174/50 |
| 2010/0015825 | A1 | 1/2010 | Ziberna |
| 2010/0317203 | A1 | 12/2010 | Tracy et al. |
| 2011/0147036 | A1 | 6/2011 | Cheng |

FOREIGN PATENT DOCUMENTS

| CN | 102868051 A | 1/2013 |
| JP | 2005-019075 A | 1/2005 |
| TW | M259952 | 3/2005 |
| TW | M380509 | 5/2010 |

* cited by examiner

*Primary Examiner* — Xuong Chung Trans
(74) *Attorney, Agent, or Firm* — HP Patent Department

(57) ABSTRACT

A port of a computing system includes a connector movable between a recessed position and an extended position. The connector is extended from the recessed position to the extended position in response to a plug.

20 Claims, 7 Drawing Sheets

PORT INCLUDING MOVABLE CONNECTOR

BACKGROUND

Connector ports, such as Input/Output (I/O) ports for computing systems, interface with a plug associated with the port. The port and housing surrounding the port present a perpendicular surface, allowing portions of the plug to extend laterally outside the port when the plug is inserted.

BRIEF DESCRIPTION OF THE DRAWINGS/FIGURES

The present examples will now be described with reference to the accompanying drawings. In the drawings, like reference numbers may indicate identical or functionally similar elements.

DETAILED DESCRIPTION

Housings having a slanted surface can accommodate a plug by including a discontinuous perpendicular surface cut out of the slanted surface of the housing. A bump out or chin in the port and/or housing has been used to present a perpendicular region in the slanted surface, and/or a housing cutout has been included or the housing otherwise has been formed nearly vertical proximate to the port to provide a perpendicular region. Examples also have exposed the I/O connector port separate from the housing, or implemented a pop-out sub-housing having a vertical surface proximate to the port, exposing the port to damage.

Example ports allow for insertion of a mating plug, and allow for a system housing associated with the ports to have a very large slope/slant relative to an orientation of the port. A tangent plane of the housing can be sloped either in a positive or negative direction, relative to the port and/or port interface. A port may be recessed into the slanted housing, and allow for full engagement between the connector of the port and the plug, even when the housing proximate to the port is not perpendicular to the orientation of the port (e.g., the housing is slanted, curved, non-uniform, or associated with a surface that is not uniformly perpendicular to port orientation).

Figure 1:
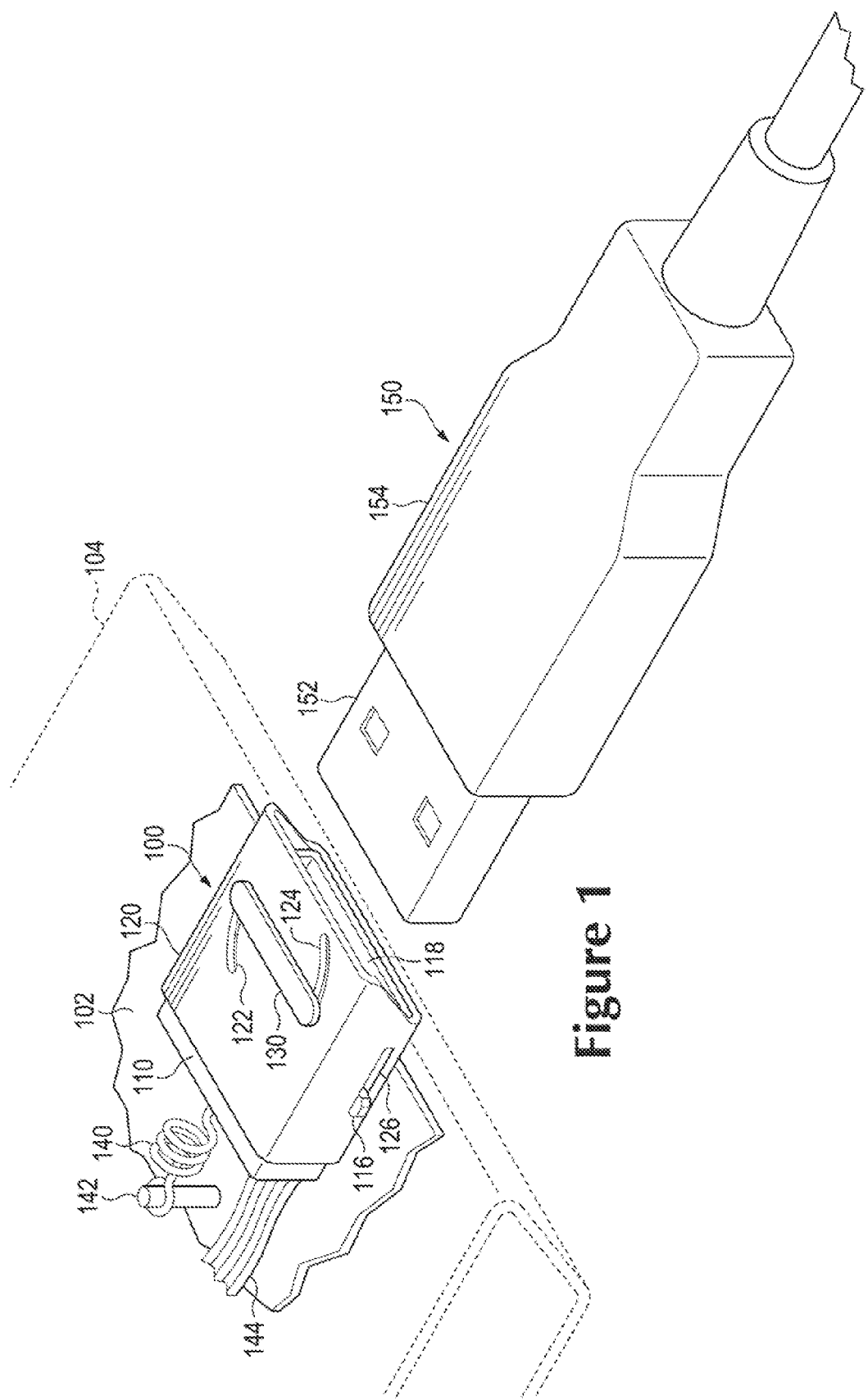
FIG. 1 is a perspective view of a port of a computing system according to an example.

FIG. 1 is a perspective view of a port 100 of a computing system according to an example. Port 100 may be mounted to main board 102 within housing 104, to provide a connector interface 118 for plug 150. Housing 104 includes a sloped wall within which port 100 may be disposed. In alternate examples, housing 104 may be sloped at angles other than the illustrated examples.

Port 100 may be accessible through housing 104 without introducing a variation in the sloped profile of housing 104 to accommodate plug 150. For example, housing 104 does not deviate from its slope proximate to the port 100, and does not include a cutout or chin to accommodate plug overmold 154 that has increased thickness compared to the plug interface 152. Port 100 enables housing 104 to maintain an uninterrupted surface contour of the sloped wall. Although housing 104 may be associated with a computing system such as a notebook computer, other devices associated with port 100 may be used including tablets, netbooks, televisions, phones, personal digital assistants (PDAs), and other devices that use ports associated with a plug.

Port 100 includes an actuator, such as pivot arm 130, to move connector 110 between a recessed position in housing 104 and an extended position to engage plug 150. Pivot arm 130 may pivot about an axis, and portions of pivot arm 130 may extend within sleeve plug slot 122 and sleeve connector slot 124 disposed in sleeve 120.

Sleeve 120 may provide stability to plug interface 152, and may provide a path within which connector 110 may be movable. Sleeve 120 may include tab slots 126 to accommodate connector tabs 116 extending from connector 110, to stabilize connector 110 and provide bounds for the movement of connector 110. Sleeve 120 may include sleeve plug slot 122 and sleeve connector slot 124, to accommodate portions of pivot arm 130. Sleeve 120 may include mounting points to mount sleeve 120 to main board 102. Sleeve 120 may be slidably coupled to connector 110 using pivot arm 130 and connector tabs 116.

Connector 110 is shown in a recessed position within sleeve 120. Connector 110 may be biased to the recessed position, using spring 140 anchored to spring pin 142, for example. Connector 110 includes a connector interface 118 to interface with plug 150. Connector interface 118 may be compatible with plug interface 152, and signal cable 144 provides a communication path to and from connector 110.

Connector interface 118 is illustrated as compatible with plug interface 152, corresponding to a type A Universal Serial Bus (USB) receptacle and plug. In alternate examples, connector interface 118 may be compatible with other types of plugs including those associated with High-Definition Multimedia Interface (HDMI), DisplayPort (DP), Video Graphics Array (VGA), Digital Visual Interface (DVI), External Serial Advanced Technology Attachment (eSATA), Ethernet, and others. Connector interface 118 may include frictional elements to retain plug interface 152, and may produce a friction force sufficient to overcome a spring force of spring 140. Spring 140 may be chosen to produce a spring force less than a friction force of the frictional elements of connector interface 118.

Thus, mounting the I/O connector 110 in fixed sleeve 120 enables connector 110 to slide in and out of housing 104, actuated by pivot arm 130 that has a plug pin exposed to the plug interface 152 and a connector pin connected to the free floating I/O connector 110. When I/O plug 150 is inserted into port 100, plug interface 152 pushes against the plug pin exposed within connector interface 118, causing pivot arm 130 to rotate about a pivot pin, extending the I/O connector 110 while at the same time making a mating connection to engage the connector 110 with I/O plug 150. The port 100 allows the sides of the system housing 104 to be angled or sloped inwards, giving the system a thinner appearance without the need for a large bump out or chin to encase the I/O port 100. The slope of the sides of housing 104 can be inwards toward the bottom, or toward the top of the system. Spring 140 may be attached to the free floating I/O connector 110 so that when the I/O plug 150 is removed, connector 110 will automatically retract back into the housing 104. Connector interface 118 has friction tabs that hold plug interface 152 in place, interacting with mating features on the I/O plug interface 152. Alternate forms of retention may be used, such as retaining screws, latches, or other mechanisms.

Figure 2:
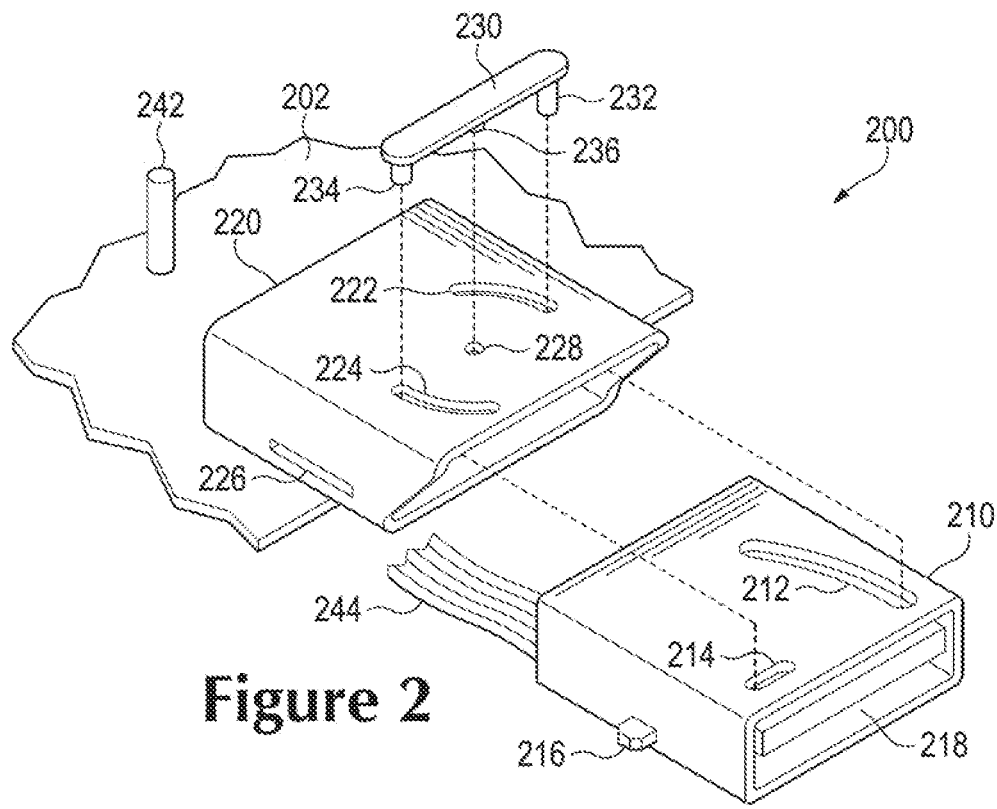
FIG. 2 is a perspective exploded view of a port of a computing system according to an example.

FIG. 2 is a perspective exploded view of a port 200 of a computing system according to an example. Port 200 includes sleeve 220, connector 210, and pivot arm 230. Sleeve 220 and spring pin 242 are mounted to main board 202. In the illustrated example, sleeve 220 may be mounted to main board 202 via its bottom surface, although alternate examples may be mounted via other surfaces including sides and/or a rear of port 200. Pivot arm 230 and connector 210 are mountable to sleeve 220.

Sleeve 220 includes pivot hole 228, sleeve plug slot 222, and sleeve connector slot 224 that correspond with pivot pin 236, plug pin 232, and connector pin 234, respectively, of pivot arm 230. Thus, pivot arm 230 may pivot about pivot pin 236 when mounted to sleeve 220. Connector pin 234 may interact with connector 210.

Connector 210 may be mountable in sleeve 220 such that connector tabs 216 correspond to tab slots 226. Signal cable 244 provides communication with connector interface 218, and signal cable 244 may be flexible to allow movement of connector 210. Connector slot 214 may receive connector pin 234 passing through sleeve connector slot 224. Connector plug slot 212 may receive plug pin 232 passing through sleeve plug slot 222.

Pivot arm 230 may be actuated, e.g., rotated in a counterclockwise direction, to cause connector 210 to move between a recessed position and an extended position. Similarly, connector 210 may be actuated, resulting in rotation of pivot arm 230. Pins of pivot arm 230 may interact with sleeve 220 and connector 210, such as during rotation, to affect actuation and extent of movement. For example, plug pin 232 may be pushed toward a rear of the port 200 by a plug interface 152 (see FIG. 1) inserted into connector interface 218. Pivot pin 236 causes pivot arm 230 to pivot connector pin 234 toward a front of the port 200. Movement of connector pin 234 may be transmitted to connector 210 via connector slot 214. Thus, insertion of a plug interface may cause extension of connector 210, to engage the plug interface. In alternate examples, pivot arm 230 may include mechanisms such as a receiver to contact the plug interface, or a force multiplier to alter to force received from the plug interface and the force transmitted to the connector 210.

Figure 3:
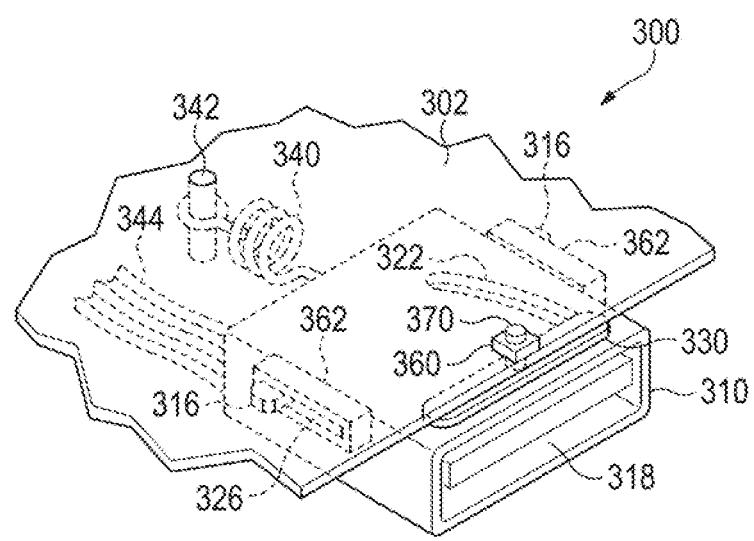
FIG. 3 is a perspective view of a port of a computing system according to an example.

FIG. 3 is a perspective view of a port 300 of a computing system according to an example. Port 300 may be mounted to main board 302 via a top surface of port 300, providing port 300 on an underside of main board 302. Port 300 may communicate with the computing system via signal cable 344, and does not include a sleeve.

Connector 310 of port 300 may be movably mounted via connector tabs 316 extending through tab slots 326. Connector 310 may be actuated by a plug interface interacting with pivot arm 330, pushing a plug pin rearward along plug slot 322 during insertion of plug interface into connector interface 318. Connector 310 may be biased to the recessed position by spring 340 connected to spring pin 342.

Connector 310 may be movable based on powered actuators that respond to sensors to detect the presence of a plug. Detector 370 may detect the presence of a plug, based on optical, magnetic, pressure, or other interaction with or proximity to the plug. Detector 370 may trigger rotary actuator 360 to rotate pivot arm 330. Detector 370 may trigger linear actuators 362 to move connector tabs 316. Connector 310 may be positioned without the use of spring 340, based on actuators 360 and/or 362, and similarly may be biased to a default (e.g., recessed) position.

Figure 4:
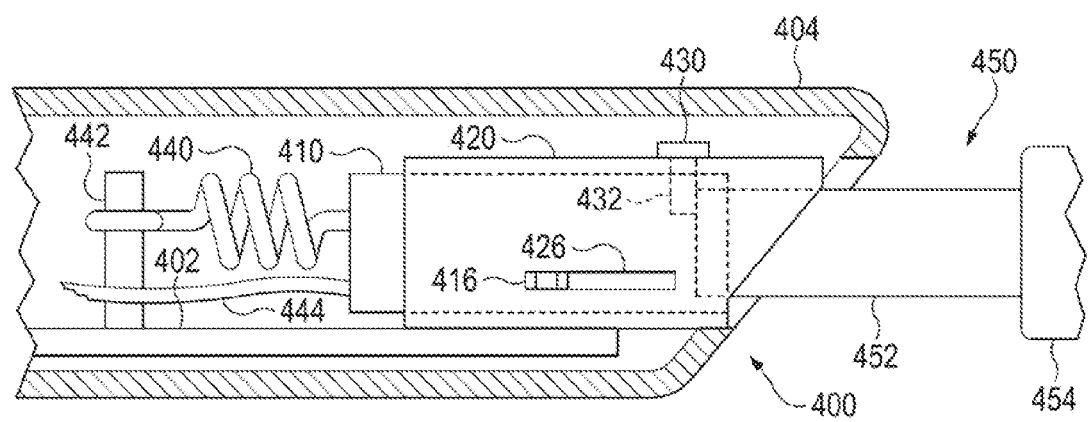
FIG. 4 is a side view of a port of a computing system according to an example.

FIG. 4 is a side view of a port 400 of a computing system according to an example. Connector 410 is illustrated in a recessed position, behind housing 404. Port 400 may be mounted to main board 402 within housing 404 of a computing system, to interface with plug 450. Port 400 includes connector 410, sleeve 420, pivot arm 430, spring 440, spring pin 442, and signal cable 444. Connector 410 includes connector tabs 416. Sleeve 420 includes tab slots 426. Pivot arm 430 includes plug pin 432. Plug 450 includes plug interface 452 and overmold boot 454.

A portion of a sloped/slanted surface of housing 404 contains an opening to provide access to port 400 and allow connector 410 to extend. A top portion of sleeve 420 is shown behind and spaced from the slanted wall of housing 404, although it may contact the housing 404. A bottom portion of sleeve 420 is shown resting on a portion of the slanted wall of housing 404, although it may be spaced from and/or behind the housing 404. The opening in the slanted wall of housing 404 corresponds to outer dimensions of the sleeve 420. In alternate examples, dimensions of the opening may be smaller (vertically and/or horizontally) such that they correspond to outer dimensions of the connector 410, and sleeve 420 may be positioned behind and/or against the slanted wall such that connector 410 may be extended through the opening in the slanted wall. Sleeve 420 and the opening in the slanted wall may be dimensioned such that outer surfaces of sleeve 420 are in contact with inner surfaces of the opening in the slanted wall of housing 404. Plug 450 may be received at port 400, illustrated as partially inserted into sleeve 420 and connector 410, such that plug interface 452 contacts plug pin 432.

Figure 5:
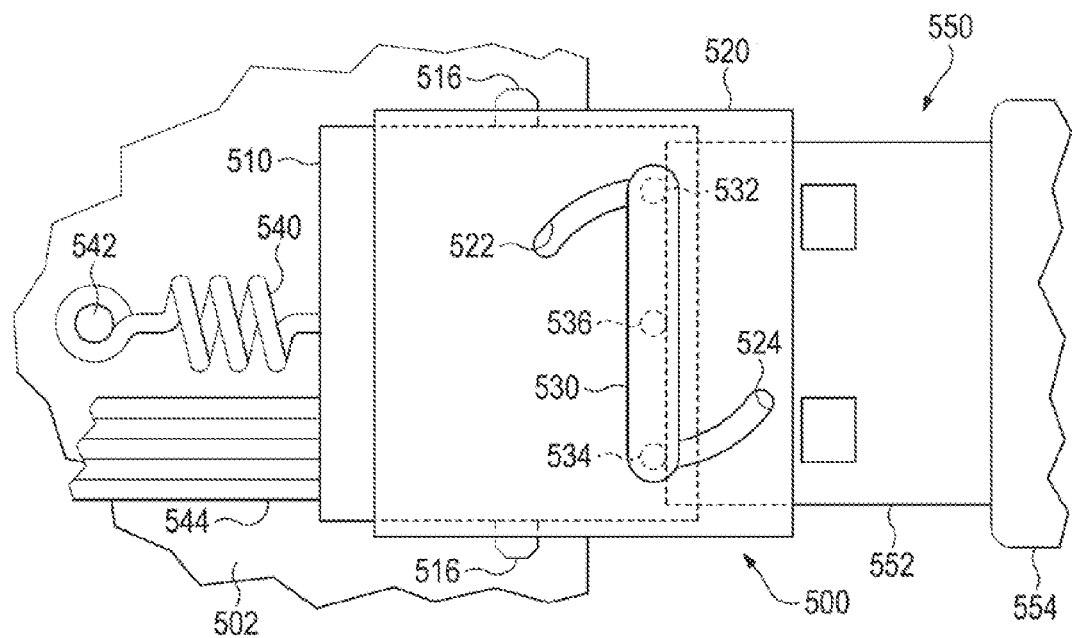
FIG. 5 is a top view of a port of a computing system according to an example.

FIG. 5 is a top view of a port 500 of a computing system according to an example. Connector 510 is in a recessed position. Port 500 may be mounted to main board 502 of a computing system, to interface with plug 550. Port 500 includes connector 510, sleeve 520, pivot arm 530, spring 540, spring pin 542, and signal cable 544. Connector 510 includes connector tabs 516. Sleeve 520 includes sleeve plug slot 522, sleeve connector slot 524, and a pivot hole corresponding to pivot pin 536. Pivot arm 530 includes plug pin 532, connector pin 534, and pivot pin 536. Plug 550 includes plug interface 552 and overmold boot 554.

Plug 550 may be received at port 500. For example, plug interface 552 may contact plug pin 532 while connector 510 is in the recessed position. In alternate examples, plug interface 552 may be detected, e.g., by an optical, proximity, or other sensor associated with port 500. Thus, port 500 may actuate connector 510 based on presence of plug 550 at or near port 500. In the illustrated example, contact between plug interface 552 and plug pin 532 may provide tactile feedback, based on a biasing force such as that provided by spring 540 or other biasing mechanism including a detente.

Figure 6:
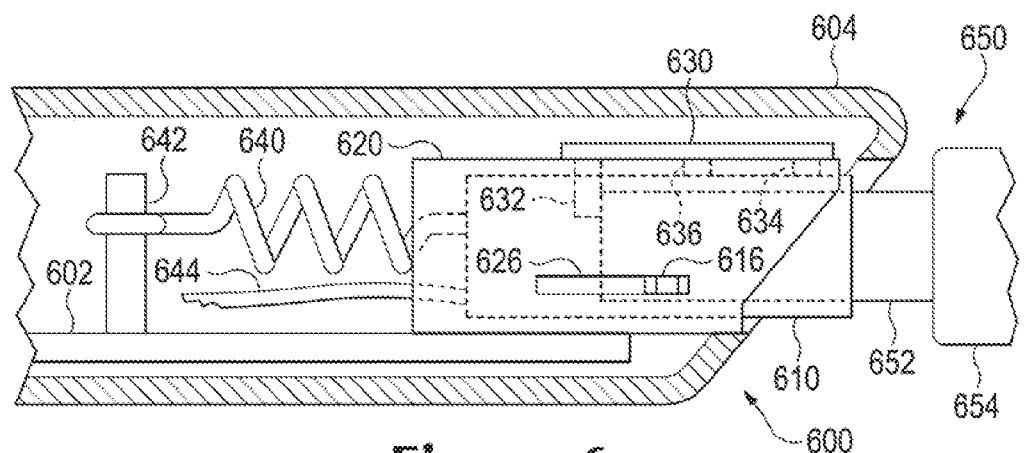
FIG. 6 is a side view of a port of a computing system according to an example.

FIG. 6 is a side view of a port 600 of a computing system according to an example. Connector 610 is illustrated in an extended position, with a portion of connector 610 extending outside of housing 604. Port 600 may be mounted to main board 602 within housing 604 of a computing system, to interface with plug 650. Port 600 includes connector 610, sleeve 620, pivot arm 630, spring 640, spring pin 642, and signal cable 644. Connector 610 includes connector tabs 616. Sleeve 620 includes tab slots 626. Pivot arm 630 includes plug pin 632, connector pin 634, and pivot pin 636. Plug 650 includes plug interface 652 and overmold boot 654.

Plug pin 632 has been pushed rearward by plug interface 652. Connector pin 634 has been pushed forward by pivot arm 630, pushing connector 610 forward into the extended position. Connector pin 634 may extend downward within connector 610 (e.g., within connector slot 214 of FIG. 2), or may be connected to a top surface of connector 610 as illustrated in FIG. 6. In the extended position, connector 610 may be positioned to engage plug interface 652. Accordingly, a position of port 600 with respect to housing 604 may be adjusted so that extended connector 610 may fully engage plug interface 652 and avoid interference between housing 604 and overmold boot 654. For example, an opening in housing 604 can be adjusted to accommodate a height of pivot arm 630, and sleeve 620 can be positioned further to the right as illustrated in FIG. 6.

Spring 640 may be extended in response to the extended position of connector 610, providing a biasing force between spring pin 642 and connector 610. The biasing force may be overcome by a friction force between connector 610 and plug interface 652. The friction force may be provided by features of the connector and/or plug, including latching or other features to secure plug 650 to connector 610. Port 600 may include a locking or detent mechanism to hold the connector 610 in the extended position, independently of whether plug 650 is present. A biasing force associated with spring 640 may be selected in view of the friction force and latching features associated with the port/plug implementation. Other biasing techniques may be used, such as springs or actuators associated with connector tabs 616 and/or pivot arm 630.

Figure 7:
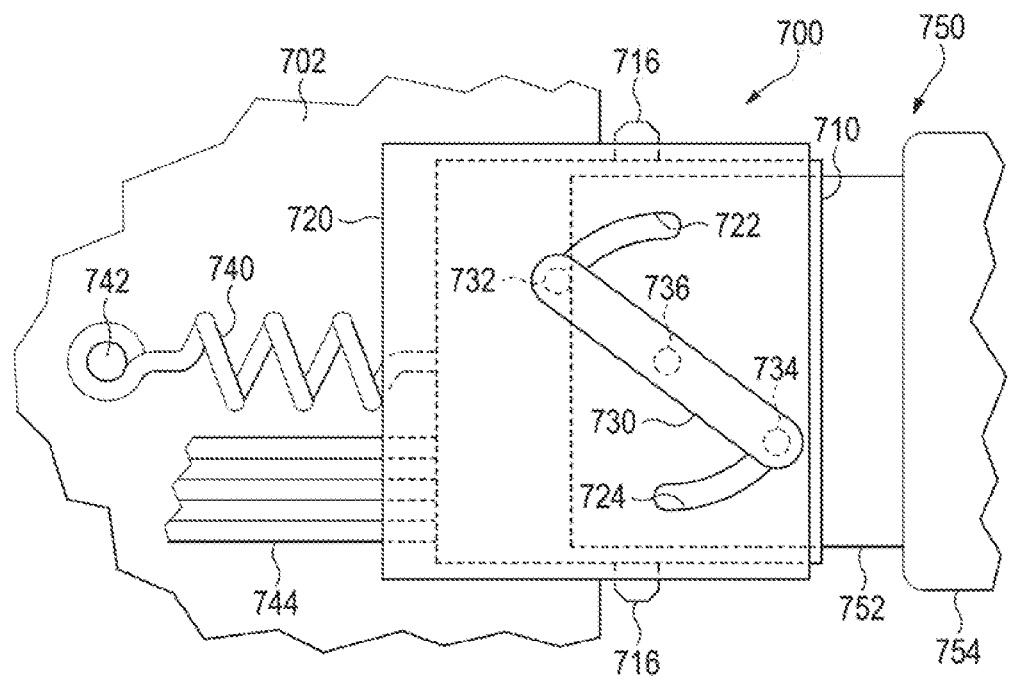
FIG. 7 is a top view of a port of a computing system according to an example.

FIG. 7 is a top view of a port 700 of a computing system according to an example. Connector 710 is in an extended position, including pivot arm 730 rotated in a counterclockwise direction. Port 700 may be mounted to main board 702 of a computing system, to interface with plug 750. Port 700 includes connector 710, sleeve 720, pivot arm 730, spring 740, spring pin 742, and signal cable 744. Connector 710 includes connector tabs 716. Sleeve 720 includes sleeve plug slot 722, sleeve connector slot 724, and a pivot hole corresponding to pivot pin 736. Pivot arm 730 includes plug pin 732, connector pin 734, and pivot pin 736. Plug 750 includes plug interface 752 and overmold boot 754.

Extension of connector 710 may be affected by various mechanisms. Plug pin 732 may reach an end of sleeve plug slot 722, connector pin 734 may reach an end of sleeve connector slot 724, and/or connector tabs 716 may reach an end of corresponding tab slots. A tether may be attached between main board 702 (e.g., to spring pin 742) and connector 710, to limit the extension of connector 710.

Figure 8:
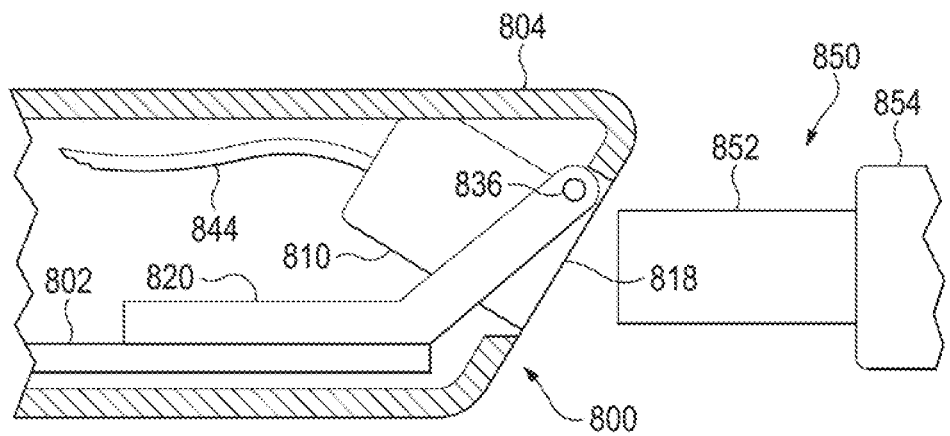
FIG. 8 is a side view of a port of a computing system according to an example.

FIG. 8 is a side view of a port 800 of a computing system according to an example. Connector 810 may be pivotable between a recessed position and extended position, and is illustrated in the recessed position. Port 800 may be mounted to main board 802 associated with housing 804. Port 800 includes connector 810, connector mount 820, pivot pin 836, and signal cable 844, to interface with plug 850 including plug interface 852 and overmold boot 854.

In the recessed position, connector interface 818 may be positioned to be flush with the slanted opening in housing 804, continuing the slanted surface of housing 804 proximate to port 800. In alternate examples, the connector 810 may be positioned further behind, or may extend beyond, housing 804 when in the recessed position. Pivot pin 836 may be located relative to connector 810 and/or connector mount 820 at various locations, including the top-front of connector 810 and connector mount 820 as illustrated, as well as other areas at the bottom, side, rear, and elsewhere along connector 810 and/or connector mount 820. Thus, a pivot point and a range of pivot angle/path between recessed and extended positions may be varied as desired, including variations to accommodate interactions between connector interface 818 and plug interface 852.

Connector 810 may be biased to the recessed position by a spring force or actuator. For example, a spring may be disposed at the pivot pin 836 to provide a force between the connector 810 and the housing 804, connector mount 820, and/or the main board 802. Pivoting of connector 810 may be bound by contact between a corner of connector 810 and an inner surface of housing 804, as illustrated in FIG. 8. A corner of connector 810 may include a slanted portion to contact housing 804. A slanted portion of connector 810 may accommodate steeper pivot angles and closer proximity of an upper surface of housing 804 to connector 810, e.g., in a slim computing device where a top and bottom surface of housing 804 are close together and provide a limited space for internal components.

Connector 810 may pivot in response to the presence of plug 850, e.g., to extend the connector interface 818 from the recessed position. For example, pivot pin 836 may include a rotary actuator to cause connector 810 to pivot. Alternate examples of port 800 may be associated with an actuator as in the examples set forth above, including a pivot arm and plug pin to react to an insertion force provided by plug 850. Connector 810 may be caused to pivot based on the interaction of plug interface 852 with connector interface 818, including interactions related to a socket configuration of connector interface 818. Thus, connector 810 allows for variations in alignment of plug 850. Connector interface 818 also may include a guide to pivotally align the connector interface 818 relative to plug interface 852. The guide may also cause the connector 810 to pivot to provide alignment between connector interface 818 and plug interface 852. Plug 850 is shown inserted flat, parallel to a top and bottom surface of housing 804 and at an angle to the slanted portion of housing 804. Plug 850 may be inserted at an angle, perpendicular to the slanted portion of housing 804 corresponding to the recessed position of connector 810. Connector 810 may be caused to pivot by pivoting inserted plug 850.

A location of pivot pin 836 (relative to connector 810, connector mount 820, and/or housing 804) may be adjusted to provide alignment of connector 810 in response to insertion/presence of plug 850. For example, pivot pin 836 may be located lower down along connector 810, such that plug interface 852 may cause connector 810 to pivot by pushing on a top area of connector 810 above the pivot pin 836.

Figure 9:
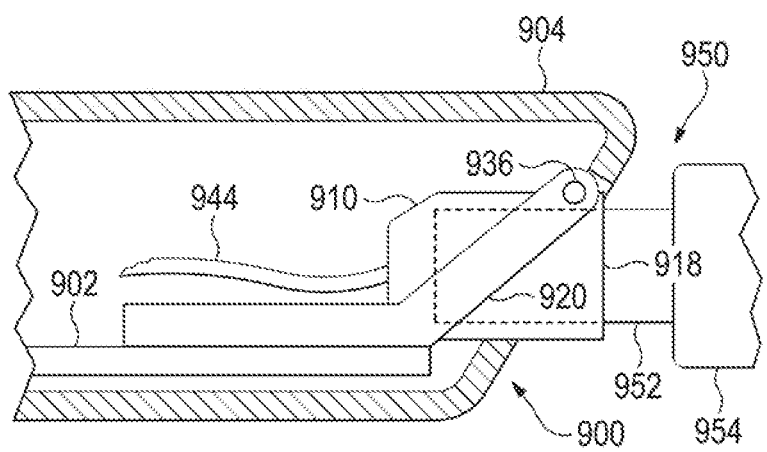
FIG. 9 is a side view of a port of a computing system according to an example.

FIG. 9 is a side view of a port 900 of a computing system according to an example. Port 900 includes connector 910 and connector mount 920, mounted to main board 902 in housing 904. Connector 910 is shown in an extended position to engage plug 950. Connector 910 includes connector interface 918, and communicates via signal cable 944.

Connector 910 may be pivotably mounted to connector mount 920 via pivot pin 936. Plug 950 includes plug interface 952 and overmold boot 954.

Port 900 may include a detent associated with pivoting connector 910. Similarly, port 900 may include a mechanism to retain connector 910 in the extended position. For example, connector 910 and inserted plug 950 may be retained in the extended position while plug 950 is inserted, and released from the extended position when plug 950 is removed. Connector mount 920 may retain connector 910 in the extended position by interacting with a side of connector 910. An actuator, such as a pivot arm, may interact with connector mount 920 to retain connector 910 in the extended position by preventing pivoting. Connector 910 may be "snapped" into place and retained in the extended position by pivoting connector 910, e.g., by pivoting inserted plug 950 (and similarly snapped out of the extended position using inserted plug 950). Connector 910 may be pivoted from the recessed position to the extended position based on a powered actuator and a proximity detection of plug 950.

Figure 10:
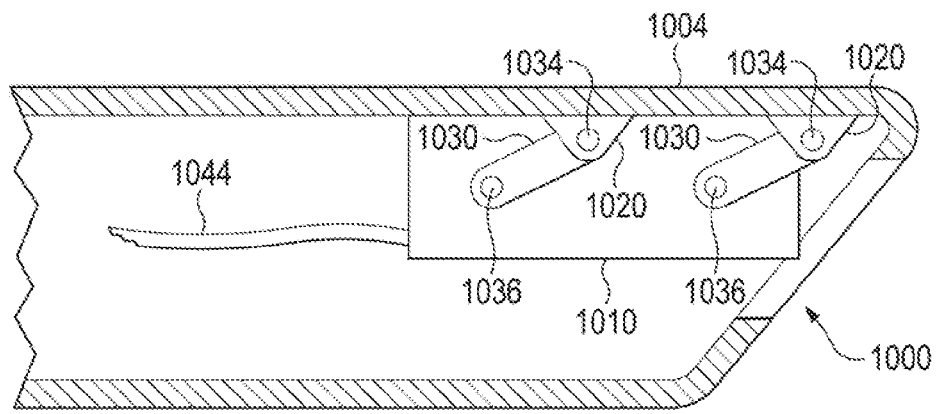
FIG. 10 is a side view of a port of a computing system according to an example.

FIG. 10 is a side view of a port 1000 of a computing system according to an example. Port 1000 includes connector 1010, connector mounts 1020, and pivot arms 1030. Connector 1010 is shown in a recessed position. Pivot arms 1030 are connected to connector mounts 1020 by connector pins 1034, and pivot arms 1030 are connected to connector 1010 by pivot pins 1036. Although two sets of equal length pivot arms 1030 are shown, a greater or fewer number of pivot arms 1030, of varying lengths, may be used. Connector mounts 1020 are shown mounted to an upper surface of housing 1004, although connector mounts 1020 may be mounted elsewhere on housing 1004 or main board, sleeve, or other mount. Signal cable 1044 provides communication to connector 1010.

The example of FIG. 10 enables connector 1010 to be positioned horizontally and vertically along a path between recessed and extended positions. Varying a length and location of pivot arms 1030 may enable variations between an angle of connector 1010 between recessed and extended positions. For example, longer pivot arms 1030 at the front of the connector 1010 and shorter arms at the rear enable the connector 1010 to extend at an angle relative to an upper surface of the housing 1004 (or other surface to which connector mounts 1020 are mounted). The recessed position is illustrated, showing connector 1010 adjacent to an upper surface of housing 1004. However, the recessed position may be associated with other orientations and locations of connector 1010 with respect to housing 1004. The example of FIG. 10 may be associated with various actuator and biasing mechanisms described with reference to other examples.

Figure 11:
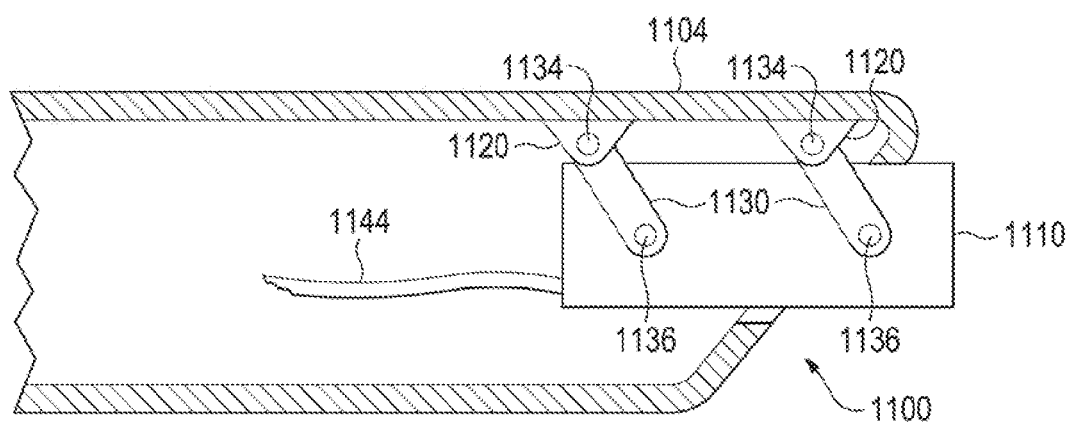
FIG. 11 is a side view of a port of a computing system according to an example.

FIG. 11 is a side view of a port 1100 of a computing system according to an example. Port 1100 includes connector 1110, connector mounts 1120, and pivot arms 1130 shown in an extended position. Pivot arms 1130 are connected to connector mounts 1120 by connector pins 1134, and to connector 1110 by pivot pins 1136. Signal cable 1144 provides communication to connector 1110. Connector 1110 is shown in the extended position protruding from housing 1104, such that a plug may be fully inserted and engaged at a position beyond an upper overhang associated with the slanted profile of housing 1104.

Figure 12:
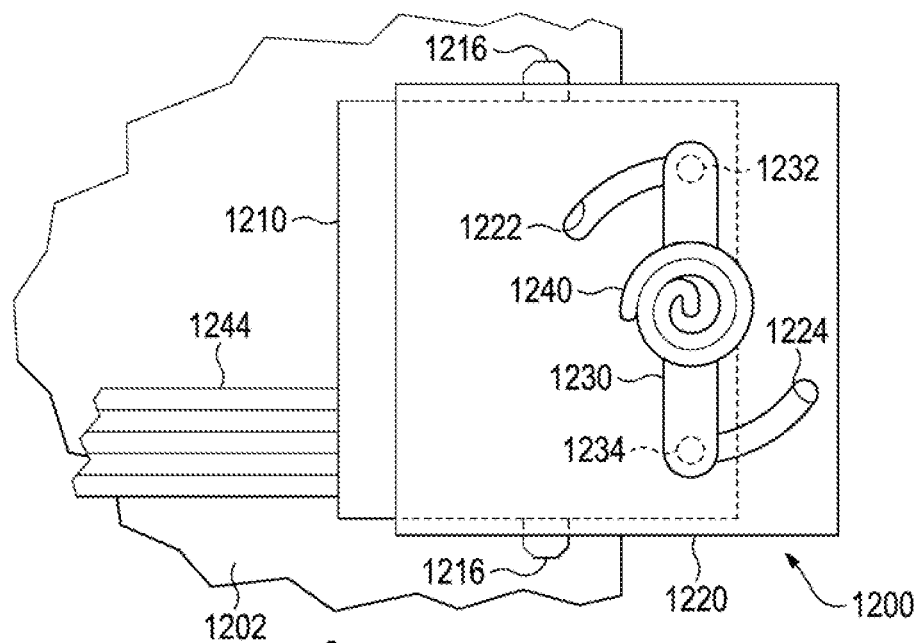
FIG. 12 is a top view of a port of a computing system according to an example.

FIG. 12 is a top view of a port 1200 of a computing system according to an example. Port 1200 includes connector 1210, sleeve 1220, pivot arm 1230, spring 1240, and signal cable 1244. Spring 1240 may be a spiral torsion spring, and may bias pivot arm 1230 in a clockwise direction to bias connector 1210 to the recessed position. Connector 1210 is shown in the recessed position, with pivot arm 1230 rotated clockwise by spring 1240. Port 1200 may be mounted to main board 1202 of a computing system. Connector 1210 includes connector tabs 1216. Sleeve 1220 includes sleeve plug slot 1222, sleeve connector slot 1224, and a pivot hole corresponding to a pivot pin (not shown) of pivot arm 1230. Pivot arm 1230 includes plug pin 1232, connector pin 1234, and a pivot pin.

Port 1200 may include alternate examples to provide a biasing force. For example, a spring may be associated with a connector tab 1216, secured to main board 1202 or sleeve 1220. A tension spring may be connected between sleeve 1220 and plug pin 1232 and/or connector pin 1234.

Alternate examples may include a door associated with an opening in the housing of the computing system proximate to the port. The door may be configured to receive the plug, based on an insertion force. The door may be triggered to open in response to plug insertion and cause a connector to move from the recessed position to the extended position, based on a spring force or actuator. The door may provide an area to be contacted by the plug, to receive a force used to load a spring to extend the connector. The door may conceal the port and prevent dust entry, and may be made to resemble a housing of the computing system.

Figure 13:
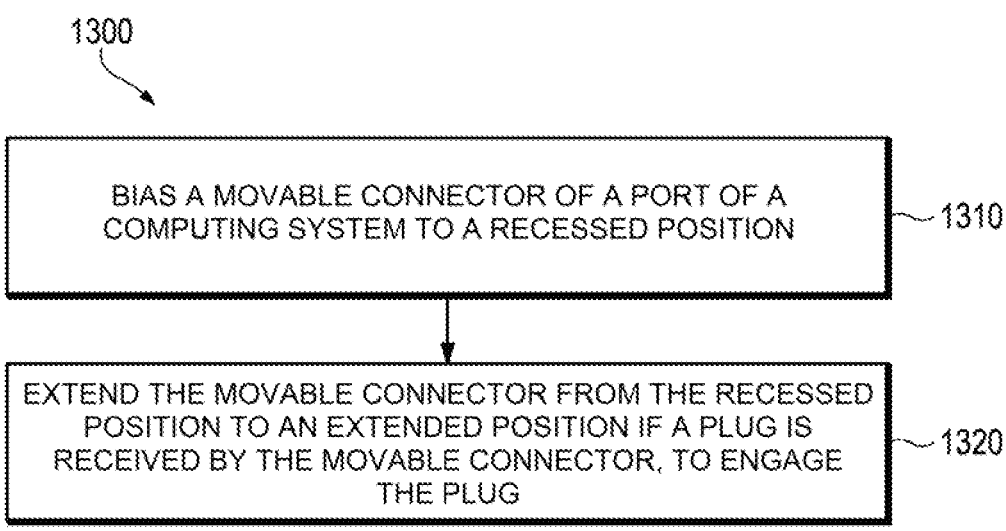
FIG. 13 is a flow chart based on a method associated with a port of a computing system according to an example.

FIG. 13 is a flow chart 1300 based on a method associated with a port of a computing system according to an example. In step 1310 a plug may be received at a port of a computing system, wherein the port includes a movable connector. The plug may be received, for example, based on contact or proximity. In step 1320, the movable connector may be extended, in response to receiving the plug, from a recessed position to an extended position to engage the plug. The extension may be based on an insertion force of a plug, or an extension force of a motorized/powered actuator.

The breadth and scope of the present invention should not be limited by any of the above-described examples, but should be defined in accordance with the following claims and their equivalents.

What is claimed is:

1. A port for a computing system, comprising:
   a connector movable between a recessed position and an extended position; and
   a pivotable structure rotatable about a pivot pin, wherein rotation of the pivotable structure caused by insertion of a plug into the connector causes the connector to move from the recessed position to the extended position to engage the plug.

2. The port of claim 1, wherein the pivotable structure is to receive an insertion force from the plug and extend the connector based on the insertion force.

3. The port of claim 2, wherein the pivotable structure includes a pivot arm having a receiving region to contact the plug to convert the insertion force to an extension force to extend the connector.

4. The port of claim 1, wherein the pivotable structure includes the connector mounted on the pivot pin.

5. The port of claim 1, further comprising an actuator to extend the connector in response to detecting the insertion of the plug.

6. The port of claim 1, further comprising a spring to bias the connector toward the recessed position.

7. The port of claim 1, further comprising a signal cable connected to associated with the connector.

8. The port of claim 1, wherein the port is a Universal Serial Bus (USB) port.

9. The port of claim 3, wherein the pivot arm has a plug pin against which the plug makes contact responsive to the insertion of the plug into the connector.

10. The port of claim 9, further comprising a sleeve outside of the connector, the sleeve comprising a sleeve plug slot to receive the plug pin, the sleeve plug slot being curved to cause rotation of the pivot arm as the plug pin moves in the sleeve plug slot responsive to a force applied by the plug on the plug pin.

11. The port of claim 10, wherein the pivot arm further has a connector pin engaged to a connector slot of the connector.

12. The port of claim 11, wherein the sleeve has a tab slot, and the connector has a connector tab slideably engaged in the tab slot.

13. The port of claim 4, wherein the rotation of the connector about the pivot pin causes the connector to move from the recessed position to the extended position.

14. A method, comprising:
biasing a movable connector of a port of a computing system to a recessed position; and
extending the movable connector from the recessed position to an extended position by rotating a pivotable structure about a pivot pin in response to insertion of a plug into the movable connector.

15. The method of claim 14, further comprising converting an insertion force from the plug to an extension force to extend the connector based on the insertion force.

16. The method of claim 14, wherein the connector in the recessed position is behind a tangent plane of a housing of the computing system proximate to the port, and the connector in the extended position is non-perpendicular to the tangent plane.

17. The method of claim 14, further comprising positioning the connector in the recessed position in response to removal of the plug from the connector.

18. The method of claim 14, wherein the pivotable structure comprises a pivot arm rotatable about the pivot pin, the pivot arm including a plug pin against which the plug makes contact responsive to the insertion of the plug into the connector, the plug pin moveable by a force applied by the plug to cause movement of the connector from the recessed position to the extended position.

19. The method of claim 14, wherein the pivotable structure includes the connector that is pivotable about the pivot pin.

20. A computing device comprising:
a housing;
a port in the housing, the port comprising:
a connector movable between a recessed position and an extended position; and
a pivotable structure rotatable about a pivot pin, wherein rotation of the pivotable structure caused by insertion of a plug into the connector causes the connector to move from the recessed position to the extended position to engage the plug.

* * * * *